No. 729,359. PATENTED MAY 26, 1903.
F. D. KOEHLER & T. W. MONAHAN.
STEAM TRAP.
APPLICATION FILED MAY 12, 1902.
NO MODEL.
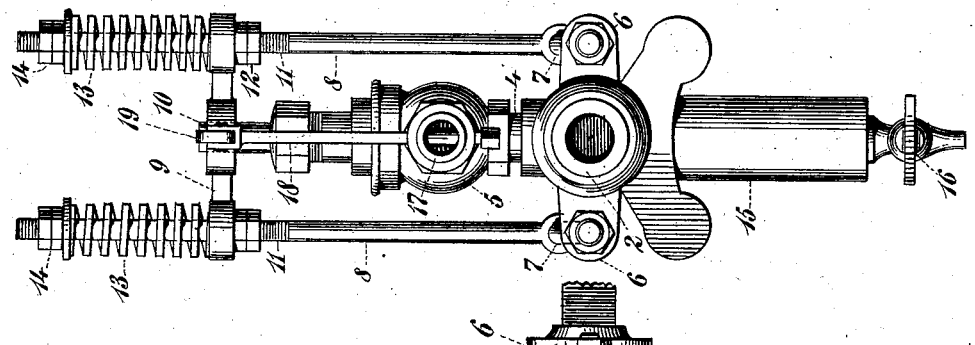
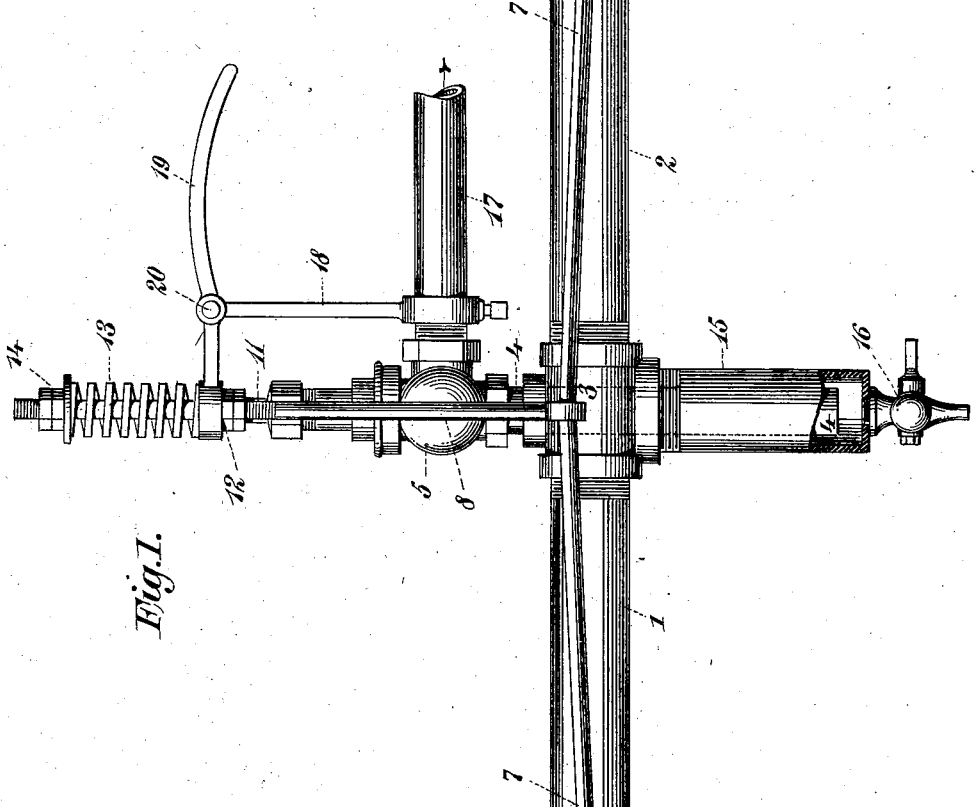
WITNESSES:
Gustav Dieterich
Harry R. Samuells
INVENTORS
Frederick D. Koehler
Thomas W. Monahan
BY
Joseph A. Stetson
their ATTORNEY No. 729,359.

Patented May 26, 1903.

UNITED STATES PATENT OFFICE.

FREDERICK D. KOEHLER AND THOMAS W. MONAHAN, OF NEW YORK, N. Y.

STEAM-TRAP.

SPECIFICATION forming part of Letters Patent No. 729,359, dated May 26, 1903.

Application filed May 12, 1902. Serial No. 106,854. (No model.)

*To all whom it may concern:*

Be it known that we, FREDERICK D. KOEHLER and THOMAS W. MONAHAN, citizens of the United States, residing in the borough of Richmond, county of Richmond, New York city, New York, have invented new and useful Improvements in Steam-Traps, of which the following is a specification.

Our invention relates to automatic steam-traps and similar devices designed to be operated by the contraction and expansion of pipes connected with a steam system.

It consists of simple and cheap but positive and quick-acting means for operating a valve by changes in temperature, together with other features described hereinafter, shown in the drawings, and set forth in the claims.

Figure 1 of the drawings is a side view of the device. Fig. 2 is an end view of the same.

Referring to the drawings, 1 and 2 are two sections of a pipe screwed into the coupling 3. Extending vertically through coupling 3 and screwed into its upper opening is the pipe 4, to which the angle-valve 5 is secured. The brackets 6 are screwed on each of the sections of pipe 1 and 2.

Between the brackets 6 and secured thereto extend on either side of the pipe-sections 1 and 2 the bent rods 7, which are engaged by the vertical rods 8, which pass through the cross-piece 9, secured to the stem 10 of angle-valve 5. The rods 8 are threaded, as shown at 11. The nuts 12 on rods 8 are below cross-piece 9. Above cross-piece 9 on rods 8 are the springs 13, retained in position by nuts 14. The sealed tube 15 is screwed into the lower opening of coupling 3, surrounding the lower end of pipe 4 and extending below it. At the bottom of sealed tube 15 is the cock 16. The pipe 17 extends from angle-valve 5 and supports the post 18, to which the lever 19 is pivoted at 20. Lever 19 is connected to valve-stem 10, as indicated in Fig. 1.

The operation of the device is as follows: As water from the system collects in pipe-sections 1 and 2 the pipe cools and contracts, carrying brackets 6 toward each other and buckling or bending rods 7 so that they rise in the middle, shoving up vertical rods 8, whose nuts 12 raise cross-piece 9 of valve-stem 10 to open angle-valve 5. The water is then forced from pipe-sections 1 and 2 down through sealed tube 15, up through pipe 4, through valve 5 and outlet-pipe 17. As the water leaves pipe-sections 1 and 2 steam enters, expanding the pipe by its higher temperature, so that brackets 6 separate, pulling rods 7 nearer a straight line and lowering rods 8 with their nuts 12 until valve 5 is reseated. Excessive expansion of the pipe will merely cause nuts 12 to be withdrawn below cross-piece 9, and the valve will be held to its seat by spring-pressure until contraction of the pipe brings nuts 12 up to cross-piece 9 to raise the same, unseating the valve, as before explained. The nuts 12 may be adjusted to control the speed of operation of the trap. The vertical movement of rods 8 is effective to actuate valve 5 only while nuts 12 are in contact with and exerting pressure upon or withdrawing it from cross-bar 9. Thus the frequency of the discharges from the trap may be regulated by increasing or diminishing the idle movement of the nuts 12—that is, their movement below cross-bar 9 when valve 5 is seated. The sealed tube 15 and pipe 4 form a pocket or water seal, so that the steam entering pipe-sections 1 and 2 has time to expand the same to close the outlet-valve before the water is entirely expelled and steam escapes. The outlet-valve may be opened at will by the hand-lever 19. The water may be allowed to escape through the cock 16.

It will be seen that a very slight expansion or contraction of pipe-sections 1 and 2 will cause a much greater movement of rods 8 and valve-stem 10. By having both brackets 6 secured to the pipe the entire expansion or contraction thereof is availed of. The greater the angle in the rods 7 the quicker will be the operation of the device. Care should be taken, however, not to arrange the rods 7 too near a straight line. In case of a sudden increase of pressure the valve, which is spring-pressed to its seat, will open, as in the case of an ordinary relief or snifting valve.

The rods 7 may of course be made in two pieces, hinged or pivoted in the middle where connected to the upright rods 8. Instead of two rods 7 on both sides of the pipe a stouter single rod may be employed, connected in any convenient way to the valve-stem 10.

We do not abandon features shown or described herein, but not claimed. The same are embraced in our divisional application, Serial No. 123,825, filed September 18, 1902.

What we claim as new, and desire to secure by Letters Patent, is—

1. A receiving-pipe, an outlet-pipe, a valve therefor, a water seal, a slightly-bent rod on each side of the receiving-pipe and secured thereto at the ends the bend in each rod being in the same direction, uprights secured to the middle of the rods, springs on said uprights tending to close the valve and nuts on said uprights adapted to engage the cross-piece of the valve-stem to open the valve.

2. A receiver adapted to expand or contract in accordance with the temperature of its contents, two bent rods secured at either end to said receiver in the line of its greatest expansion and contraction, uprights secured to the middle of the two rods, a valve, springs on said uprights held between the ends thereof and an extension from the stem of said valve, projections on said uprights adapted to raise the valve-stem when the receiver contracts and to be withdrawn when the receiver expands.

3. A receiver, a valve controlling a vent therefrom, buckled rods secured at both ends to the receiver, means interposed between the valve and the buckled rods whereby a slight expansion or contraction of the receiver causes a multiplied change in the buckling of the rods to shift the valve, means to provide spring-pressure tending to hold the valve to its seat and an adjusting device whereby the buckling of the rods may be made ineffective during a part of their movement to shift the valve.

4. A receiver, a slightly-buckled rod secured at both ends to the receiver, a valve under spring-pressure tending to seat it, means operated by the buckling of the rod for seating and unseating the valve and an adjusting device whereby a portion of the buckling movement of the rod may be made ineffective to shift the valve.

5. A receiver, a valve controlling a vent therefrom, a buckled device secured at both ends to the receiver whereby a slight expansion or contraction of the receiver causes a multiplied movement at the center of the buckled device, means interposed between said buckled device and said valve whereby the valve is actuated by the buckling, and a spring tending to hold the valve to its seat but allowing it to be unseated by excessive pressure in the receiver.

6. A receiving-pipe, an outlet-pipe, a valve therefor, a slightly-bent rod on each side of the receiving-pipe and secured thereto at the ends the bend in each rod being in the same direction, uprights secured to the middle of the rods, springs on said uprights tending to close the valve and nuts on said uprights adapted to engage the cross-piece of the valve-stem to open the valve.

7. A receiver adapted to expand or contract in accordance with changes in the temperature of its contents, a buckled device secured at both ends to the receiver whereby a slight expansion or contraction of the receiver causes a multiplied movement in the buckled device, a valve controlling an outlet from the receiver, means interposed between the valve and the buckled device whereby the valve is shifted by the buckling, and adjusting means whereby a desired portion of the contraction and expansion of the receiver may be made ineffective to shift the valve.

8. A receiver adapted to expand or contract in accordance with changes in the temperature of its contents, a valve controlling an outlet from said receiver, means whereby the expansion and contraction of the receiver seats and unseats the valve, and regulating means whereby a desired portion of the expansion and contraction of the receiver is made ineffective to move the valve.

In testimony whereof we have signed our names to this specification, in the presence of two subscribing witnesses, this 7th day of May, 1902.

FREDERICK D. KOEHLER.
THOMAS W. MONAHAN.

Witnesses:
JOSEPH A. STETSON,
HARRY R. SAMUELLS.